United States Patent
Segawa et al.

(10) Patent No.: US 7,562,685 B2
(45) Date of Patent: Jul. 21, 2009

(54) RUN-FLAT TIRE

(75) Inventors: Masahiro Segawa, Osaka (JP); Kazuhiko Kawamura, Osaka (JP); Jun Kodama, Osaka (JP); Masayuki Kanai, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 44 days.

(21) Appl. No.: 11/575,820

(22) PCT Filed: Sep. 15, 2005

(86) PCT No.: PCT/JP2005/016950

§ 371 (c)(1),
(2), (4) Date: Mar. 22, 2007

(87) PCT Pub. No.: WO2006/035603

PCT Pub. Date: Apr. 6, 2006

(65) Prior Publication Data

US 2007/0209745 A1    Sep. 13, 2007

(30) Foreign Application Priority Data

Sep. 27, 2004 (JP) ............................. 2004-279758
Nov. 2, 2004 (JP) ............................. 2004-319370

(51) Int. Cl.
*B60C 15/00* (2006.01)
*B60C 15/06* (2006.01)
*B60C 15/024* (2006.01)

(52) U.S. Cl. ............... 152/516; 152/520; 152/523; 152/539; 152/544; 152/547

(58) Field of Classification Search ............ 152/547
See application file for complete search history.

(56) References Cited

FOREIGN PATENT DOCUMENTS

| DE | 2715 105 A1 | 10/1977 |
|---|---|---|
| FR | 2 346 171 | 10/1977 |
| JP | 51-116507 | 10/1976 |

(Continued)

OTHER PUBLICATIONS

Machine translation of JP 2004-168201 (published 2004).*

*Primary Examiner*—Justin Fischer
(74) *Attorney, Agent, or Firm*—Knobbe Martens Olson & Bear LLP (57) ABSTRACT

The present invention provides a run-flat tire provided with a reinforcing rubber layer 9 arranged in a side wall section 2 so as to be formed in a crescent cross sectional shape, an annular protrusion section 10 protruding to an outer side in a tire width direction from at least one of bead sections 1, and having an inner peripheral side surface 11 facing to an outer peripheral side curved surface of a rim flange 8a at a time of installing a specified rim, and an annular bead 1b arranged in the annular protrusion section 10, in which the run-flat tire is provided with a ridge section 23 connecting to an outer side in the tire width direction from an inner peripheral side surface 11 of the annular protrusion section 10 so as to protrude to an inner peripheral side of the tire, and having an inner diameter smaller than an outer diameter of the rim flange 8a, and a soft rubber layer 15 arranged in the ridge section 23 and having a corner section 16 tapered toward the tire inner peripheral side.

12 Claims, 6 Drawing Sheets

FOREIGN PATENT DOCUMENTS

| | | |
|---|---|---|
| JP | 52-121204 | 10/1977 |
| JP | 53-138106 | 12/1978 |
| JP | 11-157311 | 6/1999 |
| JP | 2000-6621 | 1/2000 |
| JP | 2004-168201 * | 6/2004 |
| JP | 2004-182036 * | 7/2004 |
| JP | 2004-276823 A | 10/2004 |

* cited by examiner

RUN-FLAT TIRE

This application is the U.S. National Phase under 35 U.S.C. §371 of International Application PCT/JP2005/016950, filed Sep. 14, 2005, which claims priority to Japanese Patent Application No. 2004-279758, filed Sep. 27, 2004, and Japanese Patent Application No. 2004-319370, filed Nov. 2, 2004. The International Application is published under PCT Article 21(2) in a language other than English.

TECHNICAL FIELD

The present invention relates to a so-called double bead type run flat tire provided with a reinforcing rubber layer arranged in a side wall section, an annular protrusion section protruding to an outer side in a tire width direction of a bead section, and a bead arranged in the annular protrusion section.

BACKGROUND ART

Conventionally, there has been known a so-called side reinforcing type run-flat tire provided with a reinforcing rubber layer in a side wall section. In accordance with the run-flat tire mentioned above, the reinforcing rubber layer supports a tire so as to suppress a flattening at a time when an air pressure in an inner section of the tire is lowered due to a puncture or the like, whereby a run-flat traveling can be executed. However, since a pressure application to a rim of a bead section is weakened and a fitting force is lowered in a state in which the air pressure in the inner section of the tire is lowered (in a run-flat state), there is a problem that the rim tends to be detached from the bead section.

Figure 8:
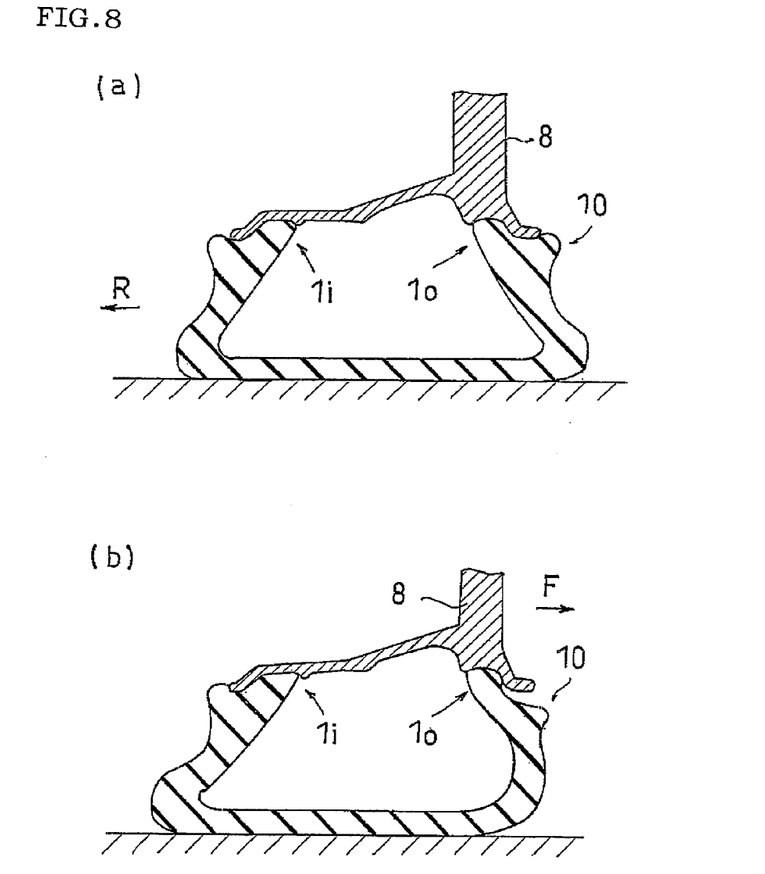
FIG. 8 is a view showing a state at a time when a vehicle turns under the run-flat traveling in a conventional run-flat tire.

As a countermeasure for the rim disengagement, there has been known a run-flat tire provided with an annular protrusion section in an outer side in a tire width direction of a bead section. For example, since an annular protrusion section 10 shown in FIG. 8(*a*) has a smaller inner diameter than an outer diameter of a rim flange while protruding to an outer side of the rim flange of a rim 8, it is possible to improve a rim disengagement resistance while holding the rim flange at a time of a run-flat traveling. However, in the run-flat tire mentioned above, it has been known that the rim disengagement resistance is not sufficient. In other words, as shown in FIG. 8(*b*), if a turning travel is executed at a comparatively high speed in a direction of R from a run-flat state, a side force F caused by a centrifugal force is applied to a vehicle so as to move the annular protrusion section 10 away from the rim flange. Accordingly, there is a problem that a bead section 1*o* positioned in an outer side of the vehicle tends to get over a hump of the rim 8 so as to disengage to an inner side.

Figure 9:
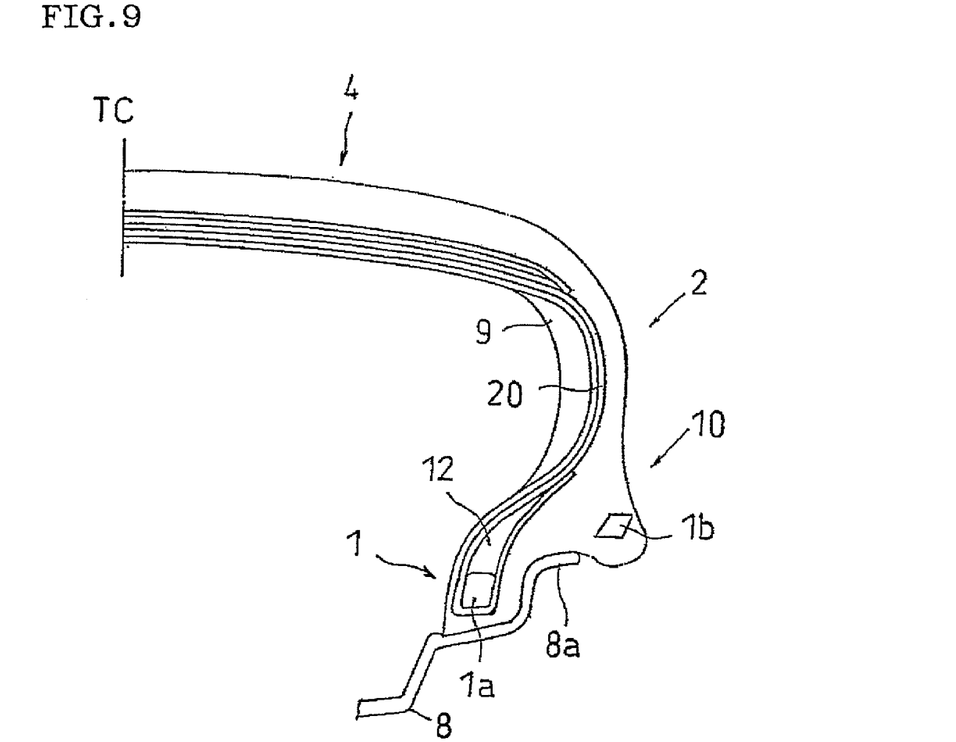
FIG. 9 is a half cross sectional view showing an example of the conventional run-flat tire.

On the contrary, as shown in FIG. 9, there has been proposed a so-called double bead type run-flat tire provided with an annular protrusion section 10 protruding to an outer side in a tire width direction of a bead section 1, and a second bead 1*b* arranged in the annular protrusion section 10. In accordance with the run-flat tire, since the annular protrusion section 10 reinforced by the second bead 1*b* can firmly hold a rim flange 8*a* at a time of a run-flat traveling, it is possible to effectively prevent the rim disengagement. The run-flat tire mentioned above is disclosed, for example, in the following patent documents 1 to 3.

However, in the conventional double bead type run-flat tire, it is hard to assemble the rim. In other words, in the rim assembly of the tire, it is necessary to temporarily drop down one side bead section to a concave section (a rim drop section) formed in a rim well section and thereafter install the bead section on a rim base. However, in the double bead type run-flat tire, it is necessary to install the bead section on the rim base and thereafter pull up the annular protrusion section to an outer side so as to get over the rim flange. As mentioned above, since the annular protrusion section has the inner diameter smaller than the outer diameter of the rim flange, and is reinforced by the second bead, it is very hard to execute an operation.

In other words, in the conventional double bead type run-flat tire, since the annular protrusion section provided for securing the rim disengagement resistance deteriorates a rim assembling property, it is hard to achieve both of the rim disengagement resistance and the rim assembling property. In this case, in the following patent document 4, there has been proposed a tire which can improve the rim disengagement resistance without deteriorating the rim assembling property, however, the tire mentioned above is structured such as to secure the rim assembling property by bending a flexible protrusion section to an outer side, and there is not disclosed a structure which can prevent a rim disengagement in the run-flat state by forming the second bead.

Further, in the conventional double bead type run-flat tire, there is a case that the rim disengagement resistance is not sufficient, and the conventional double bead type run-flat tire can not respond to a demand of intending to securely prevent the rim disengagement. In conventional, in order to improve the rim disengagement resistance, there have been employed a means for increasing a volume of the reinforcing rubber layer or increasing a tread rigidity, however, there has been a problem that a deterioration of ride comfort performance and an increase of a tire weight are caused.

Figure 10:
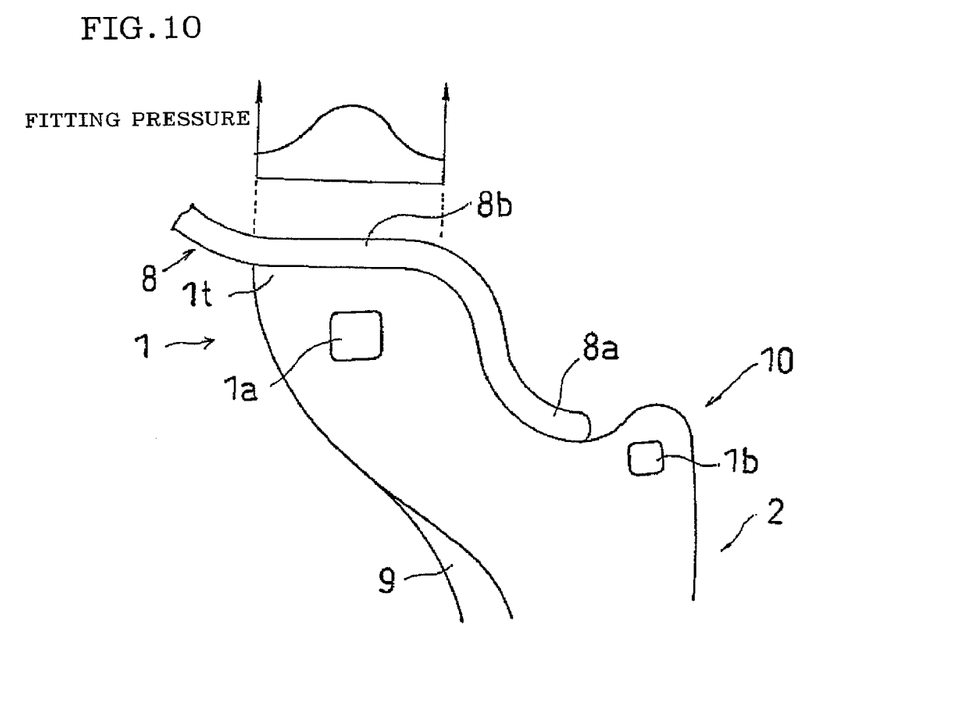
FIG. 10 is a cross sectional view of a main section showing a bead section of the conventional run-flat tire.

The inventors of the present invention have devoted themselves to research on the problem of the rim disengagement mentioned above, and have found the following matters. FIG. 10 is a cross sectional view of a main section showing a bead section of a conventional double bead type run-flat tire. In an upper side of a bead section 1, there is shown a graph of a fitting pressure applied to a rim base 8*b* at a time of grounding in the run-flat traveling. As shown in FIG. 10, it has been known that a fitting pressure of a bead toe it is comparatively low at a time of the run-flat traveling, in the conventional run-flat tire. Further, the inventors of the present invention have found that the reduction of the fitting pressure of the bead toe it lowers a fitting force to a rim 8, and deteriorates the rim disengagement resistance.

In this case, the run-flat tire described in the following patent document 5 is structured such that a rim displacement preventing layer is provided in the bead reinforcing section for the purpose of increasing a traveling performance in the run-flat state, however, the patent document 5 does not disclose a structure which can solve the problem of the rim disengagement resistance as mentioned below.

Patent Document 1: Japanese Patent Application Laid-open No. S51-116507

Patent Document 2: Japanese Patent Application Laid-open No. S52-121204

Patent Document 3: Japanese Patent Application Laid-open No. S53-138106

Patent Document 4: Japanese Patent Application Laid-open No. 2000-6621

Patent Document 5: Japanese Patent Application Laid-open No. H11-157311

DISCLOSURE OF THE INVENTION

Problem to be Solved by the Invention

The present invention is made by taking the actual conditions mentioned above into consideration, and an object of the present invention is to provide a so-called double bead type run-flat tire which can achieve both of a rim disengagement resistance and a rim assembling property.

Means for Solving the Problem

The object can be achieved by the present invention having the following structure. That is, the present invention provides a run-flat tire comprising: a pair of bead sections each having an annular first bead; side wall sections respectively extending to a tire outer peripheral side from the bead sections; a reinforcing rubber layer arranged in said side wall section so as to be formed in a crescent cross sectional shape; an annular protrusion section protruding to an outer side in a tire width direction from at least one of said bead sections, and having an inner peripheral side surface facing to an outer peripheral side curved surface of a rim flange at a time of installing a specified rim; and an annular second bead arranged in said annular protrusion section, wherein the run-flat tire comprises: a ridge section connecting to an outer side in the tire width direction from an inner peripheral side surface of said annular protrusion section so as to protrude to an inner peripheral side of the tire, and having an inner diameter smaller than an outer diameter of said rim flange; and a first soft rubber layer arranged in the ridge section and having a corner section tapered toward the tire inner peripheral side.

In accordance with the structure mentioned above, since the annular protrusion section reinforced by the second bead can hold the rim flange at a time of the run-flat traveling, an installation stability to the rim is increased, and it is possible to achieve an excellent rim disengagement resistance. Further, in accordance with the run-flat tire of the present invention, since the first soft rubber layer having the corner section tapered toward the tire inner peripheral side is arranged in the protrusion section having the inner diameter smaller than the outer diameter of the rim flange, the protrusion section tends to be bent to the inner side in the tire width direction and the rim assembling property can be improved. In other words, in the rim assembly of the tire, it is easy to execute a work of installing the bead section dropped in the rim drop onto the rim base and thereafter pulling up the annular protrusion section to the outer side so as to get over the rim flange. Accordingly, in the double bead type run-flat tire, it is possible to effectively achieve both of the rim disengagement resistance and the rim assembling property. In this case, the specified rim indicates the rim forming the standard determined by JATMA in correspondence to the tire size, and the specified rim installing time indicates a state of being installed to the specified rim at an air pressure of 180 kPa. Further, the first soft rubber layer means a softer rubber layer than the other rubber layers arranged in the protrusion section.

In the above structure, it is preferable that said first soft rubber layer is formed in a triangular cross sectional shape, and a median line passing through an apex of said corner section is inclined to an inner side in the tire width direction toward the tire inner peripheral side.

In accordance with the structure mentioned above, there is obtained the shape in which the corner section of the first soft rubber layer is inclined to the inner side in the tire width direction while being tapered toward the inner peripheral side of the tire. Accordingly, the protrusion section is more easily bent to the inner side in the tire width direction, and it is possible to more easily execute the work of pulling up the annular protrusion section so as to get over the flange. Further, since the first soft rubber layer is formed in the triangular cross sectional shape, it is possible to achieve the operations and effects mentioned above on the basis of the simple shape, while obtaining the shape which is easily arranged in the protrusion section.

In the above structure, it is preferable that in said first soft rubber layer, a hardness in accordance with JIS K6253 durometer hardness test (A type) is between 60 degree and 70 degree.

Since the hardness of the first soft rubber layer is set to the range mentioned above, it is possible to secure an effect of improving the rim disengagement resistance by the annular protrusion section while lowering the hardness of the protrusion section so as to improve the rim assembling property.

In the above structure, it is preferable that the run-flat tire is provided with a projection section formed in an inner side in the tire width direction of said ridge section, and arranged in the tire inner peripheral side from a leading end of the rim flange at a time of installing a specified rim.

In accordance with the structure mentioned above, in the case that the bead section is going to be disengaged from the rim, the projection section formed in the inner side in the tire width direction of the ridge section is engaged with the rim flange so as to prevent the annular protrusion section from moving away from the rim flange, thereby effectively improving the rim disengagement resistance. Further, since the projection section is formed in the inner side in the tire width direction of the ridge section, it is possible to effectively achieve both the rim disengagement resistance and the rim assembling property without resisting the work of pulling up the annular protrusion section so as to get over the rim flange at a time of assembling the rim.

Figure 11:
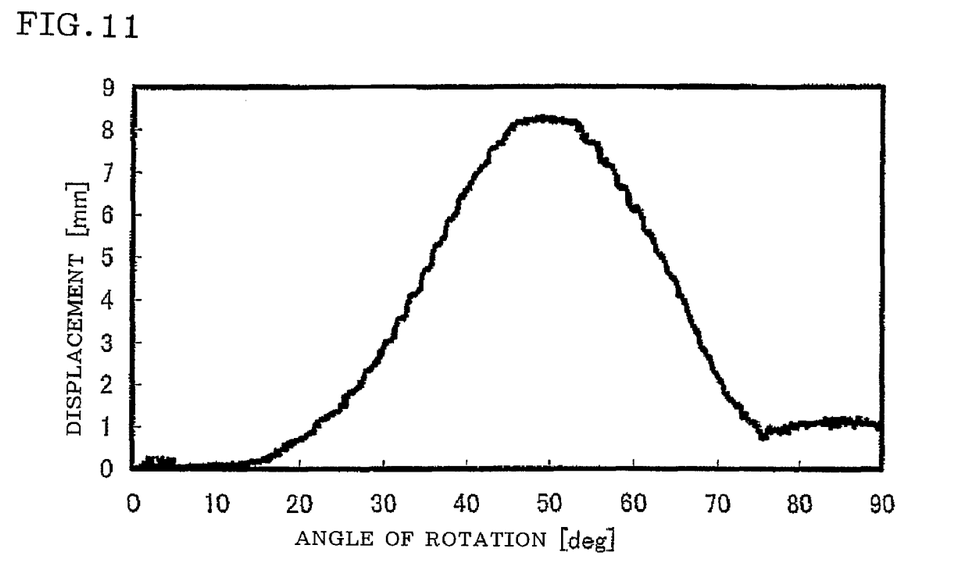
FIG. 11 is a graph showing a displacement of an annular protrusion section to an inner side in a tire diametrical direction.
Figure 12:
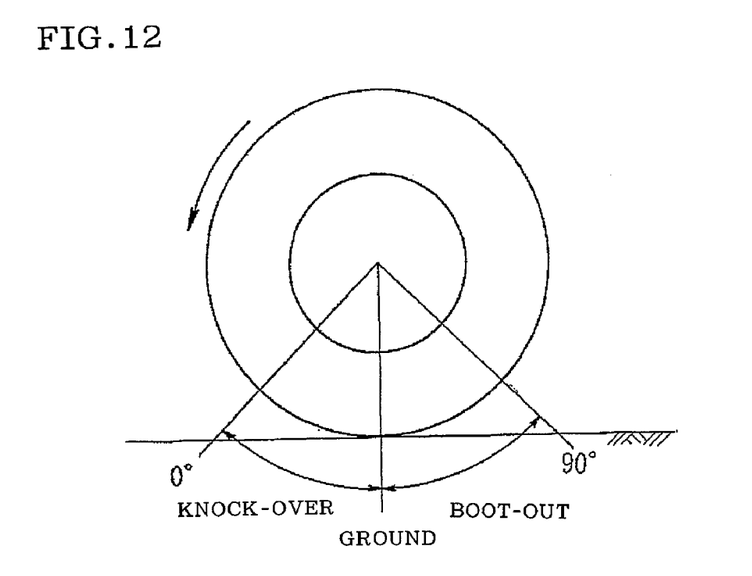
FIG. 12 is a schematic side elevational view explaining an angle of rotation of a tire.

The inventors of the present invention have devoted themselves to research the rim disengagement in the double bead type run-flat tire in order to achieve an excellent rim disengagement resistance, and have found the following matters. In other words, results shown by a graph in FIG. 11 are obtained by researching a displacement of the annular protrusion section in accordance with a tire rolling in the run-flat traveling. A horizontal axis of the graph corresponds to an angle of rotation of the tire corresponding to FIG. 12, and a range of 45 degree is set to each of a knock-over side and a boot-out side with respect to a ground center point in a circumferential direction. A vertical axis corresponds to a displacement to the inner side in the tire diametrical direction of the annular protrusion section. In accordance with FIG. 11, it is known that the annular protrusion section is displaced to the inner side in the tire diametrical direction, in the knock-over side at a time of the tire rolling.

In other words, in the double bead type run-flat tire, there has been known that when the air pressure in the inner section of the tire is lowered due to a fault such as a puncture or the like, the annular protrusion section having the second bead is displaced to the inner side in the tire diametrical direction in the knock-over side at the tire rolling time, while the side wall section causes the bending deformation. Further, the inventors of the present invention have found that a moment having a supporting point in a region which is in contact with the rim flange is generated by the behavior mentioned above, and the moment lowers the fitting pressure of the bead toe. The structure mentioned below of the present invention is made by paying attention to the moment mentioned above.

In other words, the run-flat tire in accordance with the present invention is preferably structured such that in the structure mentioned above, the inner peripheral side surface of the annular protrusion section is provided with a second soft rubber layer arranged near a contact point of a tangential line capable of being drawn from an intersecting point between a straight line drawn from a center of the first bead to an inner side in the tire diametrical direction and an outer peripheral side surface of the rim base, to an outer peripheral side curved surface of the rim flange at a time of installing a specified rim.

As mentioned above, in the double bead type run-flat tire, since the annular protrusion section having the second bead is displaced to the inner side in the tire diametrical direction while the side wall section generates the bending deformation, at the run-flat traveling time, the moment having the supporting point in the region which is in contact with the rim flange is generated. The moment has a remarkable effect of lowering the fitting pressure of the bead toe in the case of setting the contact point of the tangential line capable of being drawn from the intersecting point between the straight line extending to the inner side in the tire diametrical direction from the center of the first bead and the outer peripheral side surface of the rim base, to the outer peripheral side curved surface of the rim flange, to the supporting point. Therefore, in accordance with the structure of the present invention, it is possible to disperse the moment mentioned above by setting the second soft rubber layer near the contact point mentioned above of the inner peripheral side surface of the annular protrusion section. As a result, it is possible to effectively suppress the fitting pressure lowering of the bead toe so as to secure the fitting force to the rim, and it is possible to achieve an excellent rim disengagement resistance.

In this case, the second soft rubber layer corresponds to a softer rubber layer than the other rubber layers arranged in the inner peripheral side surface of the annular protrusion section. In this case, the run-flat tire described in the patent document 5 mentioned above is not the so-called double bead type run-flat tire, but is structured such that the rim deflection preventing layer is arranged in the section facing to the rim flange upper section, and can not achieve the excellent rim disengagement resistance by dispersing the moment mentioned above.

In the above structure, it is preferable that a run-flat tire as claimed in claim 5, wherein in the case of setting a point facing to said contact point in the inner peripheral side surface of said annular protrusion section to a reference point, a distance from the reference point to a center of said first bead in the tire width direction to L1, a distance from said reference point to a center of said second bead in the tire width direction to L2, a distance from said reference point to an inner end in the tire width direction of the inner peripheral side surface of said second soft rubber layer to a, and a distance from said reference point to an outer end in the tire width direction of the inner peripheral side surface of said second soft rubber layer to b, the run-flat tire satisfies a relation $0.2L1 \leq a \leq 0.5L1$ and $0.3L2 \leq b \leq 0.8L2$.

It is possible to suppress the strength reduction of the inner peripheral side surface of the annular protrusion section so as to secure the bead durability while dispersing the moment of lowering the fitting pressure of the bead toe so as to increase the rim disengagement resistance, by setting the region in which the second soft rubber layer is arranged to the range mentioned above. In this case, the point facing to the contact point indicates an intersecting point between a normal line drawn from the contact point and the inner peripheral side surface of the annular protrusion section.

In the above structure, it is preferable that in said second soft rubber layer, a hardness in accordance with JISK6253 durometer hardness test (A type) is between 50 degree and 65 degree.

It is possible to suppress the strength reduction of the inner peripheral side surface of the annular protrusion section so as to secure the bead durability while dispersing the moment of lowering the fitting pressure of the bead toe so as to increase the rim disengagement resistance, by setting the hardness of the second soft rubber layer to the range mentioned above.

In the above structure, it is preferable that a fiber layer is arranged between said second bead and said second soft rubber layer.

Since the annular protrusion section reinforced by the second bead and the fiber layer is pressed to the outer peripheral side curved surface of the rim flange at the run-flat traveling time, by arranging the fiber layer between the second bead and the second soft rubber layer, it is possible to effectively increase the fitting force to the rim, and it is possible to achieve the more excellent rim disengagement resistance.

| Description of Reference Numerals | |
|---|---|
| 1 | bead section |
| 1a | first bead |
| 1b | second bead |
| 2 | side wall section |
| 4 | tread section |
| 8 | rim |
| 8a | rim flange |
| 8b | rim base |

-continued

Description of Reference Numerals

| | |
|---|---|
| 9 | reinforcing rubber layer |
| 10 | annular protrusion section |
| 11 | inner peripheral side surface |
| 13 | second soft rubber layer |
| 15 | first soft rubber layer |
| 15a | median line |
| 16 | corner section |
| 18 | projection section |
| 20 | carcass layer |
| 23 | ridge section |
| 26 | fiber layer |

MODE FOR CARRYING OUT THE INVENTION

An embodiment of the present invention will be explained with reference to the drawings.

FIRST EMBODIMENT

Figure 1:
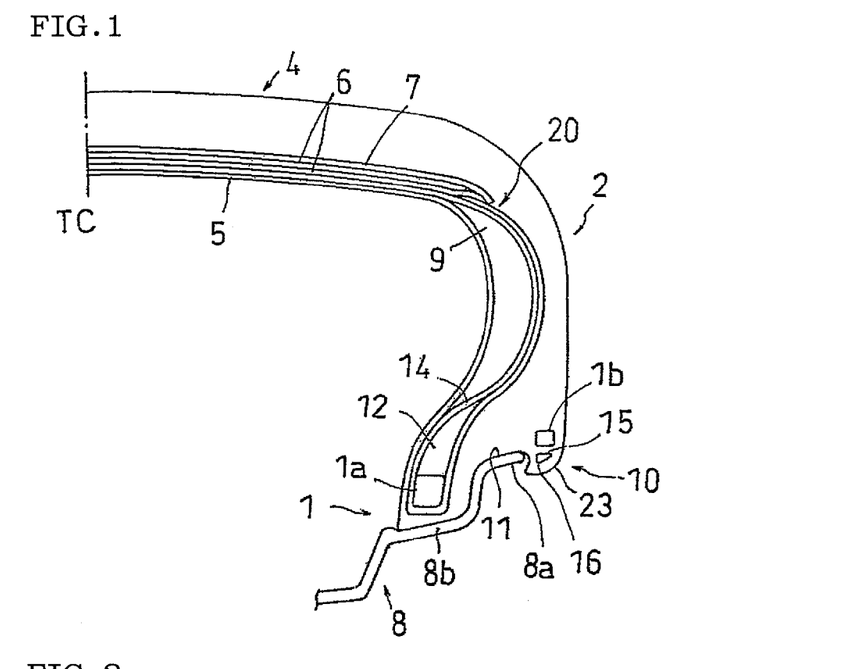
FIG. 1 is a half cross sectional view showing an example of a run-flat tire in accordance with a first embodiment of the present invention.
Figure 2:
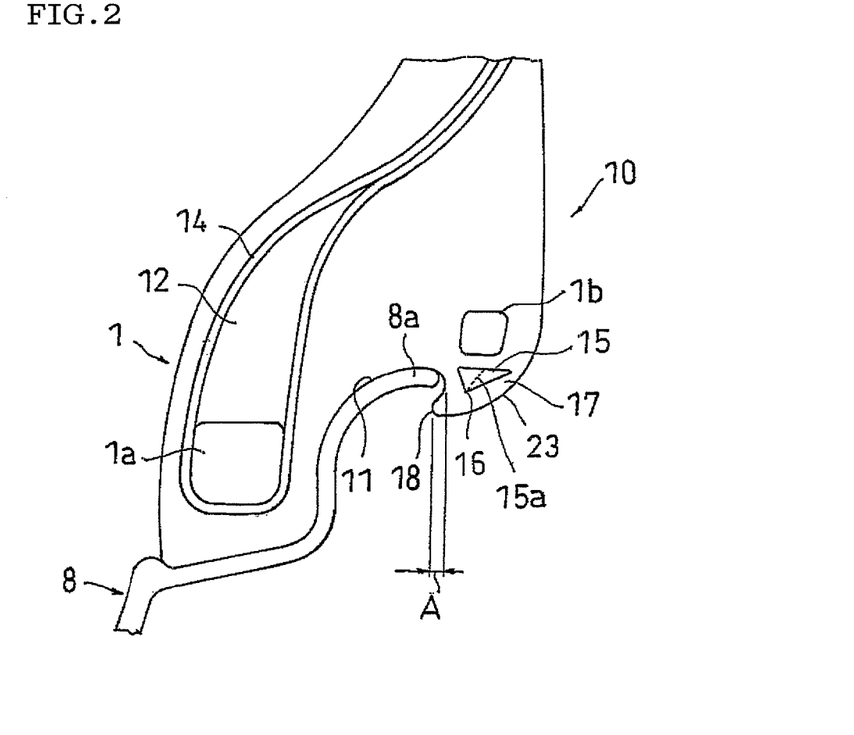
FIG. 2 is a cross sectional view of a main section schematically showing a bead section of the run-flat tire shown in FIG. 1.

FIG. 1 is a half cross sectional view showing an example of a run-flat tire in accordance with a first embodiment of the present invention installed to a specified rim. FIG. 2 is a cross sectional view of a main section schematically showing a bead section of the run-flat tire shown in FIG. 1.

The run-flat tire is provided with a pair of annular bead sections 1, side wall sections 2 respectively extending to tire outer peripheral sides from the bead sections 1, and a tread section 4 connecting the respective outer peripheral side ends of the side walls 2 to each other via a shoulder section, as shown in FIG. 1. A bead 1a (corresponding to the first bead) in which a converged body of bead wires, for example, constituted by a steel wire is formed in an annular shape in a tire peripheral direction is arranged in the bead section 1, and a bead filler 12 is arranged in an outer periphery of the tire. The bead section 1 is arranged in the tire outer periphery of a rim base 8a of a rim 8, and is pressed by the rim flange 8a if a normal air pressure exists, whereby the tire is fitted to the rim 8.

A carcass layer 20 is constituted by a carcass ply 14 structured, for example, such that a polyester cord is arranged at approximately 90 degree with respect to a tire equator line TC, and is arranged in such a manner as to be bridged between a pair of bead sections 1. The carcass ply 14 is wound up to an outer side in a tire width direction in such a manner as to pinch the bead 1a and the bead filler 12.

A reinforcing rubber layer 9 in which a tire meridian cross section is formed in approximately a crescent shape is arranged in an inner side of the carcass layer 20 of the side wall section 2. Accordingly, when an air pressure in the inner section of the tire is lowered, a bending deformation of the tire is suppressed, and a run-flat traveling can be executed. The reinforcing rubber layer 9 is constituted, for example, by a rubber layer in which a rubber hardness (a rubber hardness measured in accordance with JISK6253 type A durometer hardness test) is between 65 degree and 90 degree. In this case, the reinforcing rubber layer 9 provided in the run-flat tire in accordance with the present invention can adopt any reinforcing rubber layer without being specifically limited by a thickness, a hardness or the like, as far as the reinforcing rubber layer is used in a conventional side reinforcing type run-flat tire. Further, the reinforcing rubber layer 9 is not limited to the structure constituted by a single rubber layer, but may be structured by a plurality of rubber layers having different physical properties such as hardness or the like.

An inner liner layer 5 for holding the air pressure is arranged in an inner peripheral side of the carcass layer 20. Further, a belt layer 6 and a belt reinforcing layer 7 for reinforcing on the basis of a hoop effect are arranged in an outer peripheral side of the carcass layer 20. The belt layer 6 is constituted by two belt plies each structured, for example, such that a steel cord is arranged at an angle of about 25 degree with respect to the tire equator line TC, and is layered in such a manner that the steel cords intersect in inverted directions between the belt plies. As a cord constituting the carcass ply or the belt ply, an organic fiber such as a rayon, a nylon, an aramid or the like is used in addition to the cords mentioned above. Generally, in order to increase an adhesive property to the rubber, a surface treatment, an adhesion treatment or the like is applied to the cords.

The structure described above is the same structure as that of the general side reinforcing type run-flat tire, and the present invention can be applied to any run-flat tire having the structure mentioned above. Examples of raw material rubbers for the rubber layer and the like are natural rubber, styrene-butadiene rubber (SBR), butadiene rubber (BR), isoprene rubber (IR), butyl rubber (IIR) and the like. These rubbers are reinforced using filler such as carbon black and silica, and cure, accelerator, plasticizer, antioxidant or the like is appropriately mixed.

An annular protrusion section 10 is formed in an outer side in a tire width direction of the bead section 1. The annular protrusion section 10 in the present embodiment protrudes to an outer side in the tire width direction from the rim flange 8a, and has an inner peripheral side surface 11 facing thereto along an outer peripheral side curved surface of the rim flange 8a. It is preferable that the annular protrusion section 10 is formed in each of the bead sections 1 in both sides, however, it is preferable that the annular protrusion section 10 is formed at least in one bead section 1, and can be formed, for example, only in an outer side of a vehicle at a time of being installed.

The bead 1b (corresponding to the second bead) in which the bead wire is formed in an annular shape in the tire peripheral direction is arranged in the annular protrusion section 10. The bead 1b in accordance with the present embodiment is arranged in such a manner that a center position is positioned in a tire outer peripheral side from an outermost diameter point of the rim flange 8a and in an outer side in the tire width direction. The bead 1b is not limited to the structure constituted by the converged body of the same bead wires as those of the bead 1a, but may be constituted, for example, by a converged body of organic fibers or a rubber bead made of a fiber reinforcing rubber.

The ridge section 23 is connected to the outer side in the tire width direction from the inner peripheral side surface 11 of the annular protrusion section 10, and is formed in such a manner as to rise up to a tire inner peripheral side. The ridge section 23 is formed in an annular shape, and has an inner diameter smaller than an outer diameter of the rim flange 8a. The inner diameter of the ridge section 23 is exemplified by an inner diameter 4.0 to 14.0 mm smaller than an outer diameter of the rim flange 8a. In this case, an outer diameter of the rim flange 8a indicates a diameter in the outermost diameter point of the rim flange 8a. Since the annular protrusion section 10 has the ridge section 23, the annular protrusion section 10 effectively holds the rim flange 8a at the run-flat traveling time, whereby it is possible to improve a rim disengagement resistance.

A soft rubber layer 15 (corresponding to the first soft rubber layer) is arranged annularly in the ridge section 23, and is structured by the softer rubber layer than the other rubber layer 17 constituting the ridge section 23. A rubber hardness of the rubber layer 17 is, for example, between 73 degree and 80 degree, and it is preferable that the soft rubber layer 15 has a rubber hardness lower than that of the rubber layer 17 by 5 degree or more. The soft rubber layer 15 has a corner section 16 tapered toward the tire inner peripheral side, and is arranged in the tire inner peripheral side of the bead 1b in such a manner that a tire meridian cross section is formed in a triangular shape. Accordingly, the ridge section tends to bend to an inner side in the tire width direction at a time of assembling the rim, and it is possible to easily execute a work of pulling up the annular protrusion section 10 to the outer side so as to get over the rim flange 8a.

The rubber hardness of the soft rubber layer 15 is preferably between 60 degree and 70 degree, and more preferably between 65 degree and 70 degree. If the rubber hardness of the soft rubber layer 15 is less than 60 degree, there is a tendency that the hardness of the ridge section 23 is excessively lowered, and the rim disengagement resistance is lowered. On the other hand, if the rubber hardness becomes more than 75 degree, the ridge section is hard to bend to the inner side in the tire width direction, and there is a tendency that an effect of improving the rim assembling property becomes small.

The soft rubber layer 15 is preferably arranged such that the tire meridian cross section is formed in the triangular shape as in the present embodiment, and is more preferably structured, as shown in FIG. 2, such that a median line 15a passing through an apex of the corner section 16 tapered toward the tire inner peripheral side is inclined to the inner side in the tire width direction toward the tire inner peripheral side. In this case, the median line indicates a segment connecting an apex of a triangle and a median point of an opposite side facing to the apex. In accordance with the structure mentioned above, the tire meridian cross section of the soft rubber layer 15 is formed in a triangular shape in which the corner section 16 is inclined to the inner side in the tire width direction while being tapered toward the tire inner peripheral side, and the ridge section 23 tends to bend to the inner side in the tire width direction so as to improve the rim assembling property.

A dimension of the soft rubber layer 15 can be appropriately set in correspondence to the dimension of the ridge section 23, however, a thickness (a dimension in a tire diametrical direction) of the soft rubber layer 15 is preferably between 1.5 mm and 5.0 mm, and more preferably between 2.0 mm and 3.5 mm. If the thickness is less than 1.5 mm, there is a tendency that an effect of bending the ridge section 23 by the soft rubber layer 15 becomes small. On the other hand, if it becomes more than 5.0 mm, the hardness of the ridge section 23 is excessively lowered, and there is a tendency that the rim disengagement resistance is lowered.

A projection section 18 protruding to an inner side in the tire width direction is formed in the ridge section 23 in accordance with the present embodiment. The projection section 18 is arranged in the tire inner peripheral side from the leading end of the rim flange 8a, whereby the projection section 18 is engaged with the rim flange 8a at a time when the bead section 1 is going to detach from the rim 8, and it is possible to effectively improve the rim disengagement resistance. Since the projection section 18 mentioned above is formed in the inner side in the tire width direction of the ridge section 23, the projection section 18 does not obstruct a work of pulling up the annular protrusion section 10 to the outer side so as to get over the rim flange 8a.

A dimension of the projection section 18 can be appropriately set, however, it is preferable that a protruding amount A based on the inner side surface in the tire width direction of the protrusion section 23 is between 1.0 mm and 2.5 mm. In the case that the protruding amount A is more than 2.5 mm, the projection section 18 excessively protrudes to the inner side in the tire width direction, and there is a tendency that it is hard to arrange the projection section 18 in the tire inner peripheral side from the leading end of the rim flange 8a at time of assembling the rim. On the other hand, in the case that the protruding amount A is less than 1.0 mm, the protruding amount of the projection section 18 is too small, and there is a tendency that an effect of engaging with the rim flange 8a so as to suppress the rim disengagement becomes small. In the structure mentioned above, the inner surface in the tire width direction of the ridge section 23 indicates a surface which is connected from the inner peripheral side surface 11 of the annular protrusion section 10 and is positioned in the outermost side in the tire width direction.

Figure 3:
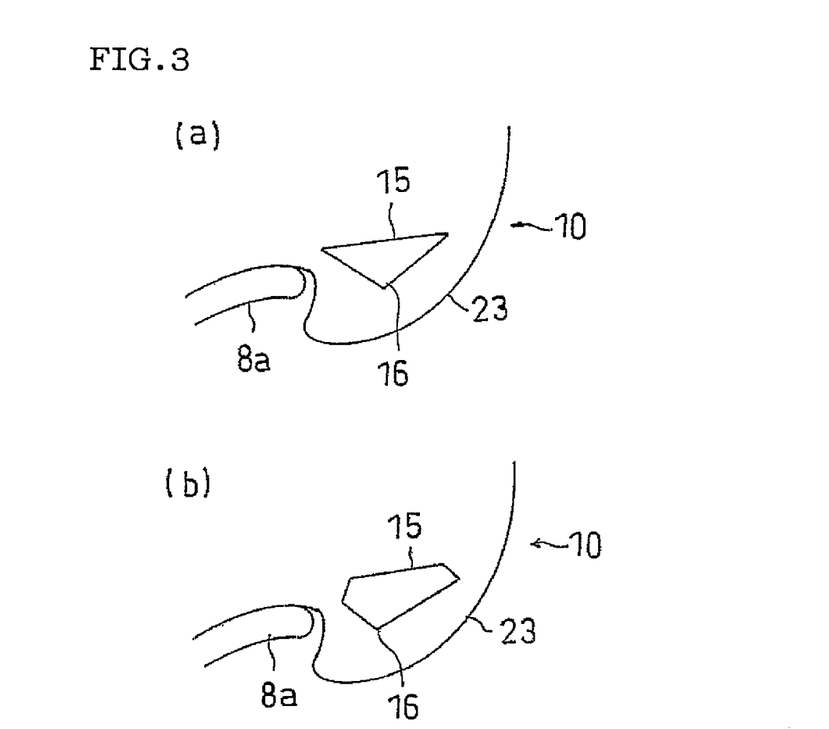
FIG. 3 is a cross sectional view of a main section showing a shape of a soft rubber layer of run-flat tire in accordance with the other aspect of the present invention.

OTHER ASPECT OF FIRST EMBODIMENT (1) The soft rubber layer 15 provided in the run-flat tire in accordance with the present invention can be formed in various cross sectional shapes so as to be provided in the ridge section 23 as far as the soft rubber layer 15 has the corner section 16 tapered toward the tire inner peripheral side. For example, the soft rubber layer 15 shown in FIG. 3(a) is formed in an isosceles triangular shape in which lengths of both sides of the corner section 16 are equal. Further, the soft rubber layer 15 shown in FIG. 3(b) is formed in a pentagonal sectional shape. In the case that the soft rubber layer 15 is formed in the other cross sectional shapes than the triangular shape, it is preferable that a bisector of the corner section 16 tapered toward the tire inner peripheral side is inclined to the inner side in the tire width direction toward the tire inner peripheral side. In this case, a chamfer or a roundness may be applied to the corner section 16 or the other corner section.

(2) The projection section 18 may be continuously provided annularly in a uniform cross sectional shape along the tire peripheral direction, or may be intermittently provided along the tire peripheral direction.

Figure 4:
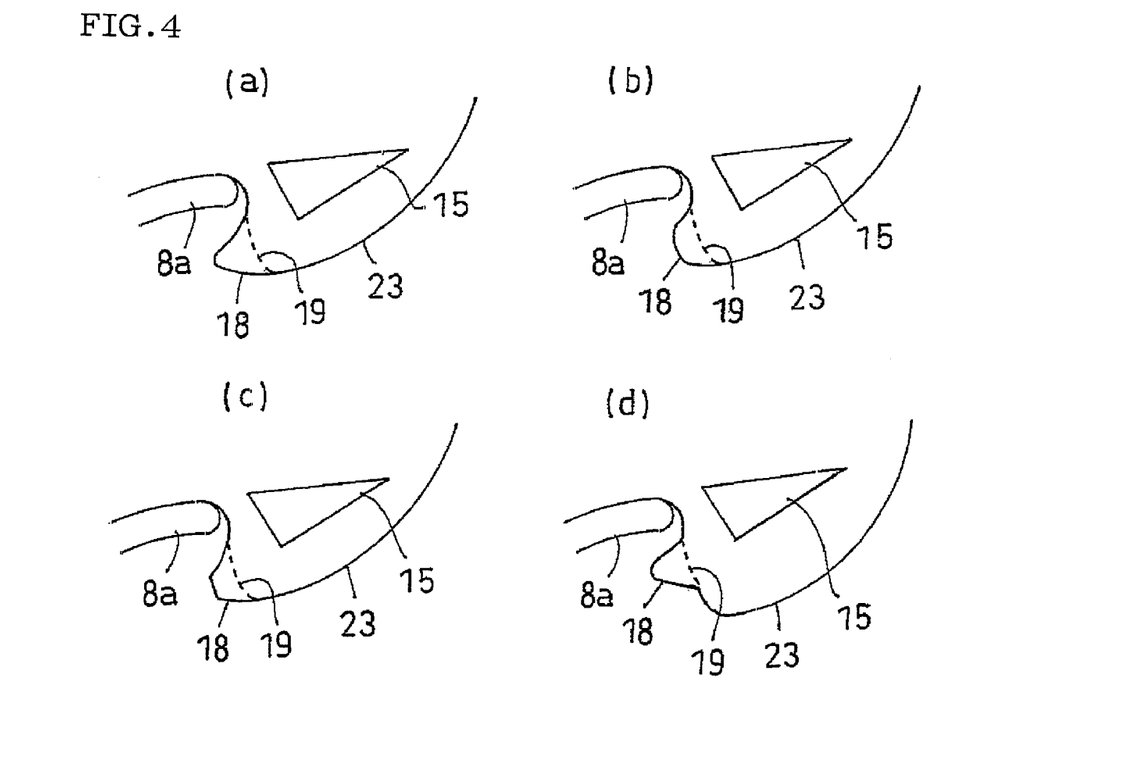
FIG. 4 is a cross sectional view of a main section showing a shape of a projection section of the run-flat tire in accordance with the other aspect of the present invention.

(3) In the first embodiment mentioned above, there is shown the example in which the projection section 18 is formed in the triangular cross sectional shape as shown in FIG. 4(a), however, the present invention is not limited to this. For example, the projection section 18 shown in FIG. 4(b) is formed in a semicircular cross sectional shape, and the projection section 18 shown in FIG. 4(c) is formed in a trapezoidal cross sectional shape. Further, the projection section 18 is not limited to the projection section connected to the tire inner peripheral side end of the ridge section 23, but may be provided in the tire outer peripheral side from the tire inner peripheral side end of the ridge section 23 as shown in FIG. 4(d). In this case, in FIGS. 4(a) to 4(d), a dotted line 19 shows an outline of the ridge section 23 in the case that the projection section 18 is not provided.

(4) A reinforcing layer may be arranged in the annular protrusion section 10 along the inner peripheral side surface 11 thereof. Accordingly, it is possible to reinforce the inner peripheral side surface 11 of the annular protrusion section 10 so as to suppress an attrition caused by the contact with the rim flange 8a. As the reinforcing layer, there can be exemplified a steel cord, or a chafer constituted by an organic fiber such as a rayon, a nylon, a polyester, an aramid or the like.

EXAMPLE OF FIRST EMBODIMENT

An example tire which concretely shows the structure and effect of the present invention will be explained.

(1) Rim Disengagement Resistance

Each of test tires installed to a rim having a wheel size of 18×8JJ is attached to a left front side of an actual car (domestically built 3000 cc class FR car), and there is executed a so-called J-turn travel of turning on a circular course having a radius of 20 m in a clockwise direction from a straight traveling. Each of the test tires is set to a run flat state having an internal pressure of 0 kPa, and a rim disengagement resistance is evaluated on the basis of a traveling speed (which is in proportion to a lateral G) at a time when the rim disengagement is generated. The traveling speed starts from 25 km/h, and the travel is executed until the rim disengagement is generated in accordance with a method of 5 km/h increment. An evaluation is executed by an index number in which the conventional example 1 is set to 100. The larger the numerical value is, the higher the traveling speed at a time when the rim disengagement is generated is, that is, the more excellent the rim disengagement resistance is.

(2) Rim Assembling Property

A rim assembling property is evaluated by measuring a working time required for assembling each of the test tires to the rim. The evaluation is executed on the basis of an index number in which a conventional example 1 is set to 100. The larger the numerical value is, the shorter the working time required for assembling the rim is, that is, the more excellent the rim assembling property is.

CONVENTIONAL EXAMPLE 1

In the run-flat tire shown in FIGS. 1 and 2, a conventional double bead type run-flat tire (tire size 245/40ZR18) is manufactured so as to be provided with no soft rubber layer 15 and no projection section 18, and is set to a conventional example 1.

EXAMPLES 1 to 3

The run-flat tire is manufactured in the same manner as the conventional example except a point that the soft rubber layer 15 shown in FIG. 1 is provided, and is set to examples 1 and 2. Further, the run-flat tire is manufactured in the same manner as the example 1 except a point that the projection section 18 as shown in FIG. 1 is provided, and is set to an example 3. In this case, a protruding amount A of the projection section 18 is set to 1.5 mm.

COMPARATIVE EXAMPLE

The run-flat tire is manufactured in the same manner as the example 1 except a point that the hardness of the soft rubber layer 15 is set to that of the other rubber layer 17 arranged in the ridge section 23, and is set to a comparative example.

TABLE 1

| | Conventional example 1 | Example 1 | Example 2 | Example 3 | Comparative example |
|---|---|---|---|---|---|
| Hardness of rubber layer 17 | 75 | 75 | 75 | 75 | 75 |
| Hardness of soft rubber layer 15 | — | 67 | 60 | 67 | 75 |
| Rim disengagement resistance | 100 | 100 | 95 | 120 | 100 |
| Rim assembling property | 100 | 120 | 130 | 120 | 100 |

As shown by results in Table 1, since the ridge section tends to bend to the inner side in the tire width direction on the basis of the provision of the soft rubber layer, it is known that the examples 1 to 3 are excellent in the rim assembling property in comparison with the conventional example 1 and the comparative example. Further, it is known that each of the examples of the present invention secures the rim disengagement resistance, and it is possible to achieve both of the rim disengagement resistance and the rim assembling property. In particular, it is known that the example 3 achieves an excellent rim disengagement resistance on the basis of the provision of the projection section.

SECOND EMBODIMENT

Figure 5:
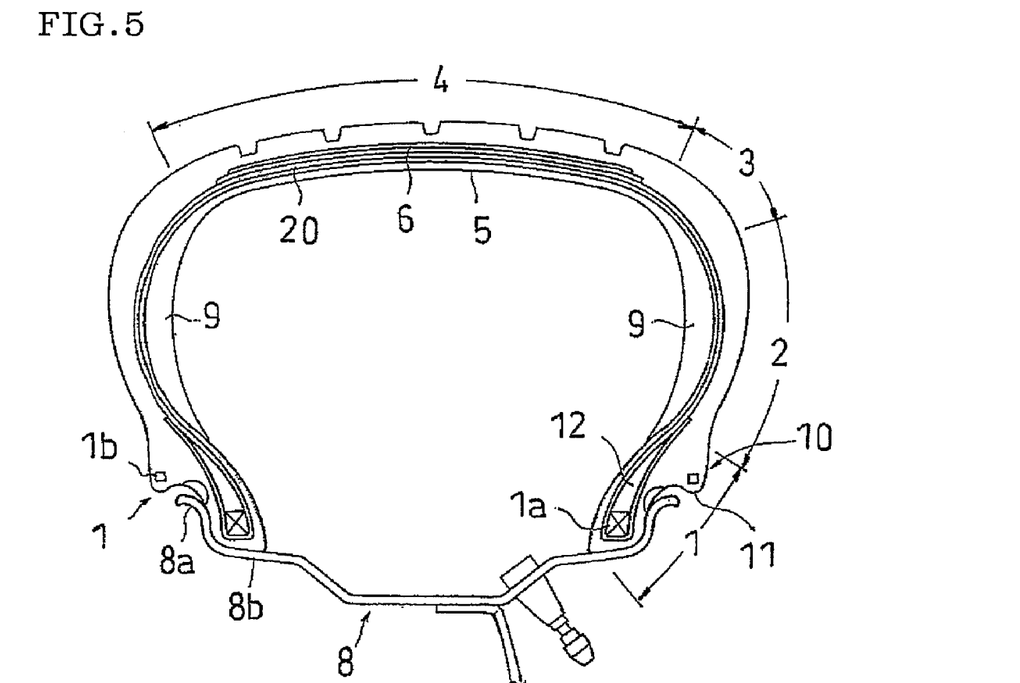
FIG. 5 is a tire meridian cross sectional view showing a run-flat tire in accordance with a second embodiment of the present invention.
Figure 6:
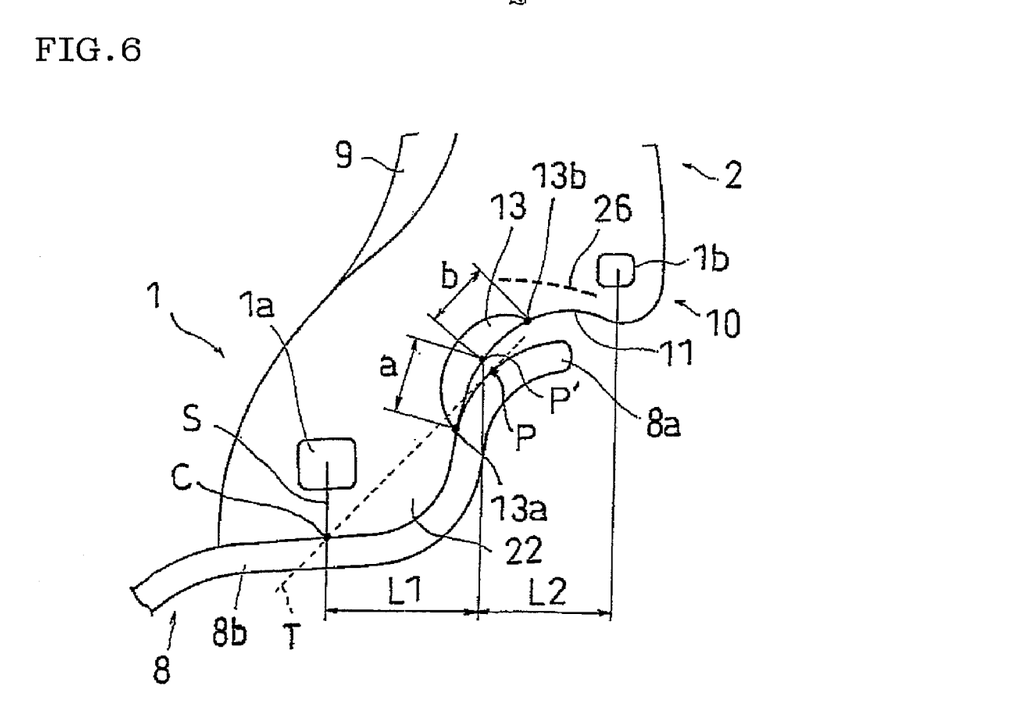
FIG. 6 is a cross sectional view of a main section showing a bead section of the run-flat tire shown in FIG. 1.

FIG. 5 is a cross sectional view of a tire meridian showing an example of a run-flat tire in accordance with a second embodiment of the present invention at a time of attaching a specified rim. FIG. 6 is a cross sectional view of a main section of a bead section at a time of attaching the specified rim to the run-flat tire. Since the second embodiment has approximately the same structure and operation as those of the first embodiment except a point that the inner peripheral side surface 11 of the annular protrusion section 10 has the following structure, the same reference numerals are attached to the same members and positions as the members and the positions described in the first embodiment, and an overlapping description will be omitted. Further, in the drawings referred in the second embodiment, the description of the soft rubber layer 15 arranged in the ridge section 13 will be omitted.

In the present embodiment, the inner peripheral side surface 11 of the annular protrusion section 10 is away little by little along the outer peripheral side curved surface of the rim flange 8a, and is smoothly connected to the side wall section 2 from the outer peripheral side. In this case, the annular protrusion section 10 is not limited to the shape shown in the present embodiment, but may be structured, for example, such that the tire meridian cross section is formed in a semicircular shape, a trapezoidal shape or the like, or may be structured such as to largely protrude to the outer side in the tire width direction so as to be capable of holding the rim flange 8a.

In the present embodiment, as shown in FIG. 6, the soft rubber layer 13 (corresponding to the second soft rubber layer) softer than the other rubber layer 22 arranged in the inner peripheral side surface 11 is arranged in the inner peripheral side surface 11 of the annular protrusion section 10. It is preferable that the soft rubber layer 13 is softer in the rubber hardness than the other rubber layer 22 by 5 degree or more. Further, the rubber hardness of the soft rubber layer 13 is preferably between 50 degree and 65 degree, and more preferably between 55 degree and 60 degree. If the rubber hardness of the soft rubber layer 13 is less than 50 degree, the attrition caused by the contact with the rim flange 8a tends to be generated. On the other hand, if it becomes more than 65 degree, the effect of dispersing the moment having the supporting point in the soft rubber layer 13 tends to become smaller, and the effect of improving the rim disengagement resistance tends to become smaller.

The soft rubber layer 13 is arranged in a region near a contact point P of a tangential line T which can be drawn from an intersecting point C between a straight line S extending to an inner side in the tire diametrical direction from a center of the bead 1a and an outer peripheral side surface of the rim base 8b, to the outer peripheral side curved surface of the rim flange 8a. In other words, the moment generated at the run-flat traveling time remarkably has an effect of lowering the fitting pressure of the bead toe at a time of setting the contact point P to the supporting point, however, it is possible to disperse the moment so as to improve the rim disengagement resistance by arranging the soft rubber layer 13 in the region near the contact point P.

In this case, a point facing to the contact point P in the inner peripheral side surface 11 of the annular protrusion section 10 is set to a reference point P'. The reference point P' corresponds to an intersecting point between a normal line drawn from the contact point P and the inner peripheral side surface 11 of the annular protrusion section 10. It is preferable that the soft rubber layer 13 is arranged in a region in which the reference point P' is set at approximately the center, as shown in FIG. 6.

Further, in the case of setting a distance in the tire width direction from the reference point P' to the center of the bead 1a to L1, a distance in the tire width direction from the reference point P' to the center of the bead 1b to L2, a distance from the reference point P' to an inner end 13a in the tire width direction of the inner peripheral side surface of the soft rubber layer 13 to a, and a distance from the reference point P' to an outer end 13b in the tire width direction of the inner peripheral side surface of the soft rubber layer 13 to b, it is preferable to satisfy a relation $0.2L1 \leq a \leq 0.5L1$ and $0.3L2 \leq b \leq 0.8L2$, and it is more preferable to satisfy a relation $0.3L1 \leq a \leq 0.41L1$ and $0.4L2 \leq b \leq 0.7L2$. If the relation $a<0.2L1$ or $b<0.3L2$ is established, the region in which the soft rubber layer 13 is arranged is too small, and there is a tendency that the effect of dispersing the moment becomes small. On the other hand, if the relation $a>0.5L1$ or $b>0.8L2$ is established, the region in which the soft rubber layer 13 is arranged is too large, and there is a tendency that the bead durability is lowered.

A thickness t of the soft rubber layer 13 on the basis of the inner peripheral side surface 11 is preferably equal to or more than 1.5 mm, and more preferably between 1.8 mm and 2.5 mm. If the thickness t is less than 1.5 mm, the soft rubber layer 13 is too thin, and there is a tendency that the effect of dispersing the moment becomes small. Further, in the present embodiment, there is shown the example in which the soft rubber layer 13 is formed in the approximately crescent shape in the tire meridian cross section, however, the present invention is not limited to this, but may be formed, for example, in a sheet shape, a semicircular shape, a trapezoidal shape or the like.

A fiber layer 26 is arranged between the bead 1b and the soft rubber layer 13. Accordingly, it is possible to effectively increase the fitting force to the rim 8 at the run-flat traveling time so as to achieve a more excellent rim disengagement resistance. As the fiber layer 26, there are exemplified a steel cord, or a chafer constituted by an organic fiber such as a rayon, a nylon, a polyester, an aramid or the like.

Figure 7:
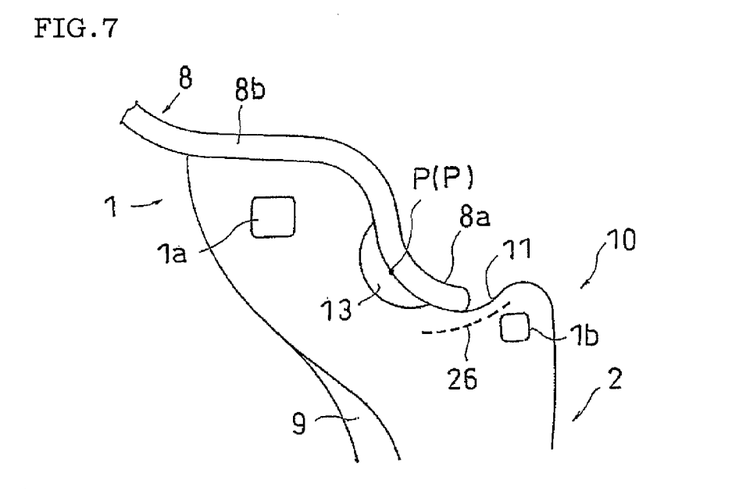
FIG. 7 is a cross sectional view of a main section showing a bead section of the run-flat tire shown in FIG. 1 at a run-flat traveling time.

FIG. 7 is a cross sectional view of a main section of a bead section positioned in a road surface side in the run-flat traveling after the air pressure in the inner section of the tire is lowered from a state shown in FIG. 6. In the state shown in FIG. 7, the annular protrusion section 10 having the bead 1b is displaced in the inner side in the tire diametrical direction while the side wall section 2 generates the bending deformation. In the case mentioned above, there is generated a moment having a supporting point in the region brought into contact with the rim flange 8a, and there is a tendency that the fitting pressure of the bead toe is lowered. However, in the present invention, since the soft rubber layer 13 is arranged near the contact point P, it is possible to disperse the moment having the effect of remarkably lowering the fitting pressure of the bead toe, and it is possible to effectively improve the rim disengagement resistance.

OTHER ASPECT OF SECOND EMBODIMENT

In the embodiment mentioned above, there is shown the example in which the inner peripheral side surface 11 of the annular protrusion section 10 moves away from the rim flange 8a in the contact point P at a time of attaching the specified rim, however, the present invention is not limited to this, but may be structured such that the inner peripheral side surface 11 of the annular protrusion section 10 is brought into contact with the rim flange 8a at the contact point P at a time of attaching the specified rim. Further, the soft rubber layer 13 may not necessarily brought into tight contact with the rim flange 8a at the run-flat traveling time, as far as the soft rubber layer 13 is arranged near the contact point P.

EXAMPLE OF SECOND EMBODIMENT

A description will be given below of an example specifically showing the structure and the effect of the present invention.

(1) Rim Disengagement Resistance

A rim disengagement resistance is evaluated on the basis of the J-turn traveling mentioned above. An evaluation is executed by an index number in which a conventional example 2 is set to 100. The larger the numerical value is, the higher the traveling speed at a time when the rim disengagement is generated is, that is, the rim disengagement resistance is excellent.

(2) Bead Durability

A test time until a problem such as failure caused by a crack, a separation or an attrition is recognized in the bead section is measured by traveling on a drum having a diameter of 1700 mm under a condition of an air pressure of 0 kPa, a speed of 80 km/h and an application of JATMA65% load, on the basis of a method in accordance with ISO draft. An evaluation is executed by an index number in which a conventional example 2 is set to 100. The higher the numerical value is, the longer the test time is, that is, the bead durability is excellent.

CONVENTIONAL EXAMPLE 2 AND EXAMPLES 4 to 10

There is manufactured a test tire having a structure shown in FIGS. 5 and 6 and a tire size of 225/45ZR17. In this case, the conventional example 2 is structured such that the soft rubber layer 13 is not provided, and only the rubber layer 22 is arranged in the inner peripheral side surface 11 of the annular protrusion section 10. In the examples 4 to 10, dimensions (L, a, b and t) of the soft rubber layer 13, and hardness of the rubber layer 22 and the soft rubber layer 13 are respectively set to values shown in Table 2. In this case, the test is executed by attaching each of the test tires to the rim having the wheel size of 17×7.5-JJ, at a time of evaluating the items mentioned above. The results are shown in Table 2.

TABLE 2

|  | Conventional example 2 | Example 4 | Example 5 | Example 6 | Example 7 | Example 8 | Example 9 | Example 10 |
|---|---|---|---|---|---|---|---|---|
| Distance L1 (mm) | — | 20 | 20 | 20 | 20 | 20 | 20 | 20 |
| Distance L2 (mm) | — | 8 | 8 | 8 | 8 | 8 | 8 | 8 |
| Distance a (mm) | — | 4 | 8 | 8 | 8 | 1 | 11 | 8 |
| Distance b (mm) | — | 3 | 6 | 6 | 6 | 5 | 8 | 6 |
| Thickness t (mm) | — | 1.6 | 1.8 | 1.8 | 1.8 | 1.8 | 1.8 | 1.2 |
| Hardness of rubber layer 22 | 71 | 71 | 71 | 71 | 71 | 71 | 71 | 71 |
| Hardness of soft rubber layer 13 | — | 58 | 58 | 48 | 68 | 58 | 58 | 58 |
| Rim disengagement resistance | 100 | 106 | 109 | 112 | 101 | 101 | 114 | 101 |
| Bead durability | 100 | 100 | 100 | 92 | 100 | 100 | 85 | 100 |

As shown in the results of Table 2, it is known that each of the examples of the present invention can disperse the moment of lifting up the bead section by setting the soft rubber layer in the inner peripheral side surface of the annular protrusion section, and is excellent in the rim disengagement resistance in comparison with the conventional example. In this case, since the soft rubber layer is too soft in the example 6, and the dimension of the soft rubber layer is too larger in the example 9, the attrition tends to be generated in the inner peripheral side surface of the annular protrusion section due to the contact with the rim flange, and there is a tendency that the bead durability becomes comparatively low. Further, since the soft rubber layer is too hard in the example 7, and the dimension of the soft rubber layer is too small in the examples 8 and 10, there is a tendency that the moment dispersing effect becomes small, and the rim disengagement resistance improving effect becomes small. On the contrary, in the example 4 and the example 5, the rim disengagement resistance can be largely improved while securing the bead durability, and it is known that it is preferable to set each of the dimensions (L, a, b and t) and the hardness of the soft rubber layer to the range mentioned above.

The invention claimed is:

1. A run-flat tire comprising:
    a pair of bead sections each having an annular first bead;
    side wall sections respectively extending to a tire outer peripheral side from the bead sections;
    a reinforcing rubber layer arranged in said side wall section so as to be formed in a crescent cross sectional shape;
    an annular protrusion section protruding to an outer side in a tire width direction from at least one of said bead sections, and having an inner peripheral side surface facing to an outer peripheral side curved surface of a rim flange at a time of installing a specified rim; and
    an annular second bead arranged in said annular protrusion section,
    wherein the run-flat tire comprises:
    a ridge section connecting to an outer side in the tire width direction from an inner peripheral side surface of said annular protrusion section so as to protrude to an inner peripheral side of the tire, and having an inner diameter smaller than an outer diameter of said rim flange; and
    a first soft rubber layer arranged in the ridge section and having a corner section tapered toward the tire inner peripheral side and made of softer material than the ridge section.

2. A run-flat tire as claimed in claim 1, wherein said first soft rubber layer is formed in a triangular cross sectional shape, and a median line passing through an apex of said corner section is inclined to an inner side in the tire width direction toward the tire inner peripheral side.

3. A run-flat tire as claimed in claim 1, wherein in said first soft rubber layer, a hardness in accordance with JISK6253 durometer hardness test (A type) is between 60 degree and 70 degree.

4. A run-flat tire as claimed in claim 1, wherein the run-flat tire is provided with a projection section formed in an inner side in the tire width direction of said ridge section, and arranged in the tire inner peripheral side from a leading end of the rim flange at a time of installing a specified rim.

5. A run-flat tire as claimed in claim 1, wherein an inner peripheral side surface of said annular protrusion section is provided with a second soft rubber layer arranged near a contact point of a tangential line capable of being drawn to an outer peripheral side curved surface of the rim flange, from an intersecting point between a straight line drawn to an inner side in a tire diametrical direction from a center of said first bead and an outer peripheral side surface of the rim base, at a time of installing the specified rim.

6. A run-flat tire as claimed in claim 5, wherein in said second soft rubber layer, a hardness in accordance with JISK6253 durometer hardness test (A type) is between 50 degree and 65 degree.

7. A run-flat tire as claimed in claim 5, wherein in the case of setting a point facing to said contact point in the inner peripheral side surface of said annular protrusion section to a reference point, a distance from the reference point to a center of said first bead in the tire width direction to L1, a distance from said reference point to a center of said second bead in the tire width direction to L2, a distance from said reference point to an inner end in the tire width direction of the inner peripheral side surface of said second soft rubber layer to a, and a distance from said reference point to an outer end in the tire width direction of the inner peripheral side surface of said second soft rubber layer to b, the run-flat tire satisfies a relation $0.2L1 \leq a \leq 0.5L1$ and $0.3L2 \leq b \leq 0.8L2$.

8. A run-flat tire as claimed in claim 5, wherein a fiber layer is arranged between said second bead and said second soft rubber layer.

9. A run-flat tire comprising:
    a pair of bead sections each having an annular first bead;
    side wall sections respectively extending to a tire outer peripheral side from the bead sections, each side wall section including a reinforcing rubber layer formed in a crescent cross sectional shape;
    an annular protrusion section protruding to an outer side in a tire width direction from at least one of said bead sections and having an inner peripheral side surface facing to an outer peripheral side curved surface of a rim flange at the time of installation;

an annular second bead arranged in said annular protrusion section;

a ridge section connecting to an outer side in the tire width direction from the inner peripheral side surface of said annular protrusion section, said ridge section protruding to an inner peripheral side of the tire at the outer side in the tire width direction; and a first soft rubber layer arranged in the ridge section and having a pointy corner section which is pointed toward the tire inner peripheral side and made of softer material than the ridge section.

10. The run-flat tire as claimed in claim 9, wherein said first soft rubber layer is formed in a triangular cross sectional shape, and a median line passing through a pointy corner of said corner section is inclined to an inner side in the tire width direction toward the tire inner peripheral side.

11. The run-flat tire as claimed in claim 9, wherein the ridge section is provided further with a projection section formed in an inner side in the tire width direction and projecting in the tire width direction.

12. The run-flat tire as claimed in claim 9, wherein the inner peripheral side surface of said annular protrusion section is provided with a second soft rubber layer arranged between a centerline of the first bead and a centerline of the second bead in the tire width direction.

* * * * *

UNITED STATES PATENT AND TRADEMARK OFFICE
CERTIFICATE OF CORRECTION

| | | |
|---|---|---|
| PATENT NO. | : 7,562,685 B2 | Page 1 of 1 |
| APPLICATION NO. | : 11/575820 | |
| DATED | : July 21, 2009 | |
| INVENTOR(S) | : Masahiro Segawa et al. | |

It is certified that error appears in the above-identified patent and that said Letters Patent is hereby corrected as shown below:

On the title page/Item [22] PCT Filed, delete "Sep. 15, 2005," and insert --Sep. 14, 2005,--.

In the Specifications:

Column 2/line 43, delete "toe it" and insert --toe 1t--.

Column 7/line 16, delete "MODE" and insert --BEST MODE--.

Column 9/line 20, delete "section" and insert --section 23--.

Signed and Sealed this
Seventh Day of May, 2013

Teresa Stanek Rea
*Acting Director of the United States Patent and Trademark Office*